Sept. 30, 1969  G. H. KELLER  3,469,449
ELECTRONIC THERMOMETER
Filed May 22, 1967
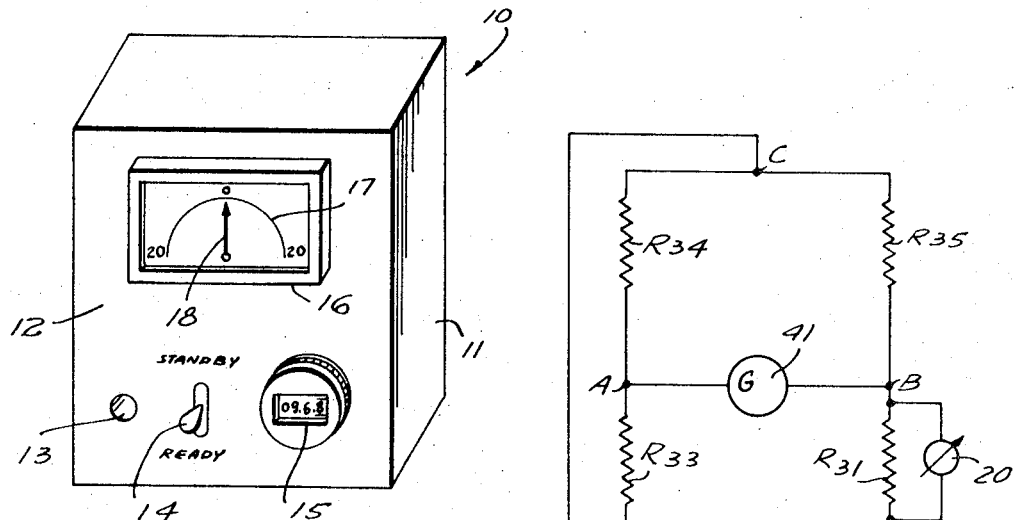
FIG. 1
FIG. 3
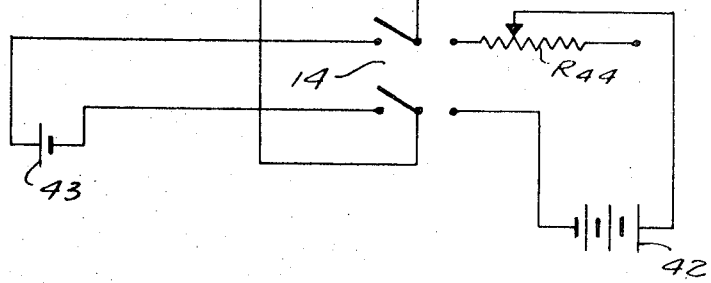
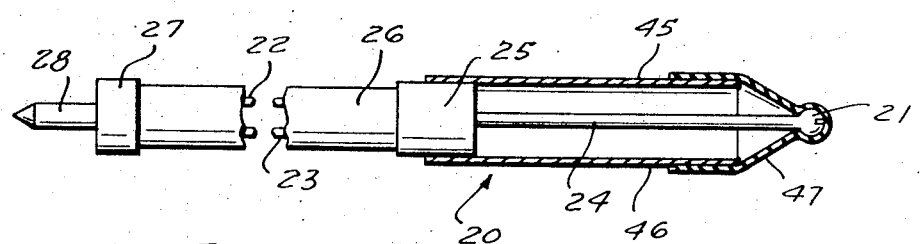
FIG. 2
INVENTOR
GEORGE H. KELLER
BY
Kane, Dalsimer, Kane, Sullivan & Smith
ATTORNEYS United States Patent Office 3,469,449
Patented Sept. 30, 1969

3,469,449
ELECTRONIC THERMOMETER
George H. Keller, Ridgewood, N.J., assignor to Dickinson Becton, and Company, East Rutherford, N.J., a corporation of New Jersey
Filed May 22, 1967, Ser. No. 640,002
Int. Cl. G01k 5/18, 5/52, 5/72
U.S. Cl. 73—362           3 Claims

ABSTRACT OF THE DISCLOSURE

A thermistor probe, preheated to a temperature at or near the temperature to be measured or instantaneously heated to this temperature, is electrically located in one leg or branch of a balanced Wheatstone bridge circuit to sense body temperature. A difference between measured temperature and preheat temperature causes an imbalance of the bridge. The bridge is rebalanced by a digital readout potentiometer which displays, upon rebalance, the measured temperature digitally to 0.01° C. accuracy. A shunt resistor is used to stabilize the non-linear temperature resistance characteristic of the thermistor.

Background of the invention

Present day clinical thermometers now in general use and of the maximum reading type are represented by the conventional mercury fever thermometer. These mercury clinical thermometers suffer from obvious disadvantages.

Specifically, mercury thermometers must be clinically clean and hand-shaken before each use. Also several minutes are required for the mercury to expand, creating an unnecessary time lag before equilibrium is reached. In some cases readings are difficult. Further, there is the change, through improper handling, that the clinical thermometer may break in the hand or the body with serious results. Further still, clinically unclean thermometers may cause infection in the patient.

It goes without saying that electronic thermometers also form part of the prior art and thermometers of this type have been developed but have not attained widespread recognition or acceptance within the industry. Generally, this is due to the fact that most, if not all, had an unnecessary time lag before a reading could be obtained since the thermistors were not preheated. Due to the time lag which was found to exist it was considered inappropriate to create an additional time lag by the introduction of a protective sterile sheath to surround the heat sensitive element. Further, many thermometers of the electronic variety lack sensitivity and are not capable of providing a digital readout of measured temperature.

Summary of the invention

By means of the present invention the problems known to the art are eliminated and the disadvantages found to exist in present day mercury fever thermometers are overcome. The invention contemplates an electronic thermometer of the type having in combination a Wheatstone bridge circuit and thermistor probe. An input line contains a double pole double throw switch to connect one of two voltage sources across the input to the bridge circuit. One voltage source, relatively large compared with the second source, has a variable resistance in series therewith and is used to preheat the thermistor probe to a temperature at or near to the expected temperature to be measured. The second source provides the necessary voltage to make a reading, and due to the low current flow through the thermistor, the thermistor will not generate sufficient heat to preclude great accuracy. The bridge comprises four legs, two of which carry fixed resistances, a third of which carries an adjustable readout device and the fourth of which carries a thermistor that is shunted by a fixed resistance. A galvanometer is placed across the output. The thermistor may be preheated to any desired temperature by adjusting the series resistance and the adjustable readout device. Application of the second voltage input and a temperature measurement will generally create a bridge imbalance. The readout device is readjusted to balance the bridge. At balance, the value of the calibrated readout device indicates the temperature sensed by the thermistor.

Accordingly it is an object of the present invention to provide an electronic thermometer having an accuracy and sensitivity equal to or better than the best mercury in glass fever thermometer; one which may be quickly preheated and maintained at any temperature; and which contains a device so that temperature may be readout digitally with an accuracy of, for example, 0.01° C.

It is also an object to obtain a relatively prompt temperature reading. This may be accomplished since the bridge is initially balanced while the thermistor probe is preferably kept at or near the expected body temperature. Thus, when the probe is inserted in the patient the time normally required for the mercury fever thermometer to reach equilibrium is reduced. Additionally, the discussed preheating permits a disposable sterile sheath to be placed over the thermistor probe thereby to eliminate the necessity of subjecting the probe to sterilization. Normally a sheath would not be practical because of the excessive time lag introduced by the poor heat transfer characteristics of the sheath but with the thermistor preheated to approximate suspected body temperature the time lag is minimal.

Other objects and advantages of the present invention will become clear as the following discussion is developed.

Description of the drawings

The accompanying drawing illustrates the present invention. By this drawing:

FIGURE 1 is a perspective view of the thermometer embodying the present invention;

FIGURE 2 is a view, partially in section, of the thermistor probe, lead wires and adapting plug for removably connecting the thermistor to the instrument housing of FIG. 1; and FIGURE 3 is a schematic presentation of the bridge circuit.

Description of the preferred embodiment

Referring to the drawing an electronic thermometer 10 is shown in FIG. 1. The thermometer is formed by a housing 11 which encloses the circuitry of FIG. 3 and provides on a front face 12 a jack 13 which receives a connector or a thermistor probe for electrically connecting the latter to the bridge circuit to be discussed.

Additionally, a STAND-BY-READY switch 14, a readout device 15 and a conventional current indicator 16 having a scale 17 and deflection needle 18, all of which will be discussed in more detail below, are provided on the front panel 12 of thermometer 10.

Thermistor probe 20 is shown in FIG. 2. The thermistor may be any one of several commercially obtainable units, such as a thermistor sold by the Yellowspring Instrument Company, Yellowspring, Ohio and presented on page 2 of their Apr. 1, 1964 bulletin. Thermistors and their operation are well known. Therefore, in general terms, the thermistor 20 includes a temperature sensitive element 21 located at the distal end of the probe and fused or otherwise connected to a pair of conductors 22 and 23 carried within a sleeve 24. As shown in FIG. 2 the sleeve extends from an enlarged base 25, the other end of which is fastened to a flexible length of insulation tubing 26. At the rear end the flexible tubing supports a connector 27 and plug 28 which, as discussed, is received in the jack 13.

A Wheatstone bridge circuit is shown in FIG. 3 and includes fixed resistors 34 and 35 in the upper branches of the bridge. The lower branches of the bridge include the thermistor 20, as better shown and discussed with regard to FIG. 2, a shunt resistor 31, a readout potentiometer 32 and a fixed balancing resistor 33. (All of the resistors are denoted on the drawing with the prefix R.) The adjustable potentiometer tap 30 is movable in relation to the adjustment of the readout device 15.

This bridge is provided with a current measuring galvanometer 41 across the circuit output A–B. The galvanometer may be any commercially obtainable type, such as a 2000 ohm Weston 25–0–25 microammeter.

Thermistor 20 has a negative temperature resistance characteristic. A thermistor, such as discussed above may be used for this purpose. Over the range of body temperatures to be measured, such a thermistor has a resistance of 1476 ohms at 35° C. (or 95.05° F.) which declines to 1109 ohms at 42° C. (or 107.6° F.).

Thermistor 20 has a non-linear temperature resistance characteristic. Thus, a fixed stabilizing resistor 31 is placed in parallel with thermistor 20 to compensate and combine, over a desired temperature range, and provide a nearly linear response with temperature changes. This is well known in the prior art, note the Beeston, Jr. Patent No. 3,036,464 wherein it is explained that a shunt resistance is necessary so that the thermistor resistance curve is linear. Linearity is required for accurate digital readout.

If shunt resistor 31 has a resistance of 1300 ohms, the combined resistance presented by thermistor 20 and resistor 31 in parallel will decrease from 691 ohms at 35° C. to 598 ohms at 42° C. This may be calculated as follows from the equation:

$$R \text{ combined} = \frac{R20 \times R31}{R20 + R31}$$

at 35° C.

$$R \text{ combined} = \frac{1476 \times 1300}{1476 + 1300} = 691 \text{ ohms}$$

at 42° C.

$$R \text{ combined} = \frac{1109 \times 1300}{1109 + 1300} = 598 \text{ ohms}$$

A digital readout potentiometer 32, which is purely resistive occupies the branch of the Wheatstone bridge opposite thermistor 20. A digital readout such as the Multidial Model 25–4 Wheel manufactured by Spectrol Electronics Corporation, San Gabriel, Calif. may be used. Such a readout has a resistance of 100 ohms for three turns, or 33.3 ohms per turn. Each turn is calibrated to readout a 10° F. range, thus for the range 35° C.–42° C. the resistance may be calculated as follows:

$$7° \text{ C.} = \frac{9}{5} \times 7° \text{ F.} = 12.6° \text{ F.}$$

The resistance of the readout 32 for a 7° C. range is therefore:

$$R32 = 33.3 \times \frac{12.6}{10} = 41.9 \text{ ohms.}$$

R32 will therefore vary from 0 to 41.9 ohms.

Once the values of the thermistor branch and of readout 32 are known, values for R33, R34 and R35 may be determined.

In the present embodiment, as an example, R35 is chosen to be 1300 ohms. The resistive values of the thermistor 20 and readout 32 at 35° C. and 42° C. are known. R33 and R34 can then be calculated so as to balance the bridge at the terminal conditions of 35° C. and 42° C. The bridge will then balance at all intermediate points.

At null, with galvanometer 41 reading zero, the bridge is balanced and the following relationship obtains:

$$\frac{R35}{R \text{ combined}} = \frac{R34}{R32} + R33$$

At 35° C. R combined is seen above to be 691 ohms and R32 will be at its maximum of 41.9 ohms. Thus:

(1) $$\frac{1300}{691} = \frac{R34}{41.9} + R33$$

Simplifying:

(2) $$691\ R34 + 1300\ R33 + 1300(41.9)$$

At 42° C., R combined is 598 ohms and R32 is turned to its minimum reading offering no resistance. Thus:

(3) $$\frac{1300}{598} = \frac{R34}{R33} = 0$$

Simplifying:

(4) $$1300\ R33 = 598\ R34$$

Solving Equations 2 and 4 simultaneously by substitution:

(5) $$691\ R34 = 598\ R34 + 1300(41.9)$$

Therefore:

(6) $$R34 = 586 \text{ ohms}$$

and (7) $$R33 = 269 \text{ ohms}$$

Thus, all of the parameters in the bridge circuit may be selected so as to permit convenient balancing in the desired range of temperature.

The bridge circuit is energized by alternate power supplies 42 and 43. Power supply 42 is used as a standby source of power which serves to preheat the thermistor 20 and constantly maintain it at approximately the preheated or suspected body temperature. Variable resistor 44 in series with power supply 42 is used to control, either manually or by a simple control circuit, the standby temperature of the thermistor 20 by varying the voltage applied to the bridge across the input C–D. For the circuit parameters given above, standby power supply 42 may be a 30 volt battery. While it may be preferred to preheat the thermistor, it is also contemplated that the thermistor may be heated by an instantaneous pulse when the thermometer is used. It is also contemplated, in the case of preheating, that the temperature may be derived and maintained automatically by known circuit arrangements.

In use, power supply 43 is applied and for the above circuit, this may be a 1.5 volt source.

Double pole-double throw switch 14 controls the application of power to the Wheatstone bridge. In standby position, switch 14 applies power from supply 42 across the bridge input. In the ready position, switch 14 applies power from supply 43 across the bridge input.

Returning to FIG. 2, it is to be pointed out that due to the preheating of the thermistor the probe and heat sensitive element may be provided with a sheath 45. The sheath may be permanent or disposable after each use, and it may be glass, plastic, an elastomeric material or any other suitable material. In the preferred embodiment the sheath includes a body portion 46 which is frictionally retained on base 25. Mounted on the body is a flexible portion 47 that is extendable over the heat sensitive element thereby to tightly fit therearound, leaving no or only a negligible air space. In this embodiment the portion 47 is elastomeric and due to the tight fit and the preheating there is little or no time lag in temperature sensing.

In operation, the thermistor is first heated to or near the expected body temperature so that when the probe is inserted, the time required to achieve equilibrium is minimized. To achieve this, switch 14 is in standby and applies the voltage of supply 42 across the circuit input C–D.

The desired thermistor temperature is selected and set on the adjustable readout 15. The temperature is read on the multiwheel indicator. Thereafter, variable resistor 44 is adjusted until galvanometer 41 and needle 18 deflection is at null. The bridge therefore is balanced. At equilibrium and circuit balance, thermistor 20 will be at the preselected temperature.

When the electronic thermometer is to be used, the probe is applied to the patient, and thereafter switch 14 is moved to the ready position which places relatively low voltage from supply 43 across the bridge input. The temperature of thermistor 20 will no longer be controlled by the self-heating current, supplied by voltage source 42, but by the patient's temperature. The temperature may be measured by adjusting the readout device 15 and reading the adjusted value when a balanced condition is again indicated by needle 18 galvanometer 21.

While the present structure provides a manually operated readout potentiometer capable of being adjusted, upon bridge imbalance, to rebalance the bridge and determine a temperature, it is also contemplated that any one of a host of conventional servo systems might be employed to rebalance an unbalanced bridge.

From the foregoing description, the objects and advantages of the invention are apparent. It should be understood, however, that the foregoing discussion is directed to a preferred embodiment and is by way of example, not limitation. Clearly modifications will be apparent to those skilled in the art which will fall within the limits of the invention.

Having described the invention, I claim:

1. For an electronic thermometer adapted to both rapidly and accurately measure a temperature difference between a sensed temperature and a preset temperature at which the hereinafter defined bridge is balanced, a Wheatstone bridge circuit comprising an indicator including a deflection needle responsive to a circuit output connected across a first and second juncton of the bridge whereby a circuit output is a consequence of said temperature difference and unbalance of the bridge is reflected by a deflection of said needle from a null position of balance; a first resistive branch; a second resistive branch; said first and second branches including fixed resistances and connected between a third junction and said first and second junctions; a third branch including a themistor and a fixed stabilizing resistance in parallel therewith; a fourth branch including a variable resistance digital readout both adjustable to said preset temperature and readjustable to said sensed temperature and a fixed compensating resistance in series therewith; said third and fourth branches connected between a fourth junction and said first and second junctions; an operating power supply including a first voltage potential for preheating the thermistor to said preset temperature as determined by said readout initial resistance setting and a series variable resistance for varying the heating effect on said thermistor and thereby balancing the bridge at said preset temperature so that there is zero current flow through said indicator, a second voltage of lesser potential for sensing a temperature; and, switch means for selectively applying and disconnecting said first and second voltages at said third and fourth junction points so that upon application of said second voltage any difference temperature reading will unbalance the bridge thereby to be rebalanced by said readjustment of said readout with the difference in resistance indicative of the sensed value.

2. The electronic thermometer of claim 1 further comprising a probe carrying at a distal end said thermistor for sensing the temperature of the human body, and a sheath, said sheath being mounted over said probe and thermistor to prevent cross-infection.

3. The electronic thermometer of claim 2 wherein said sheath is disposable.

References Cited

UNITED STATES PATENTS

| | | |
|---|---|---|
| 2,271,975 | 2/1942 | Hall. |
| 2,938,385 | 5/1960 | Mack et al. |
| 3,025,706 | 3/1962 | Oppenheim. |
| 3,117,448 | 1/1964 | Gilmont et al. |
| 3,257,606 | 6/1966 | Grant. |
| 3,339,414 | 9/1967 | Coor. |
| 3,370,260 | 2/1968 | Hardison et al. _____ 338—196 |

LOUIS R. PRINCE, Primary Examiner

FREDERICK SHOON, Assistant Examiner